(No Model.)
A. J. WOLFF.
BICYCLE OR TRICYCLE WHEEL.
No. 559,654. Patented May 5, 1896.
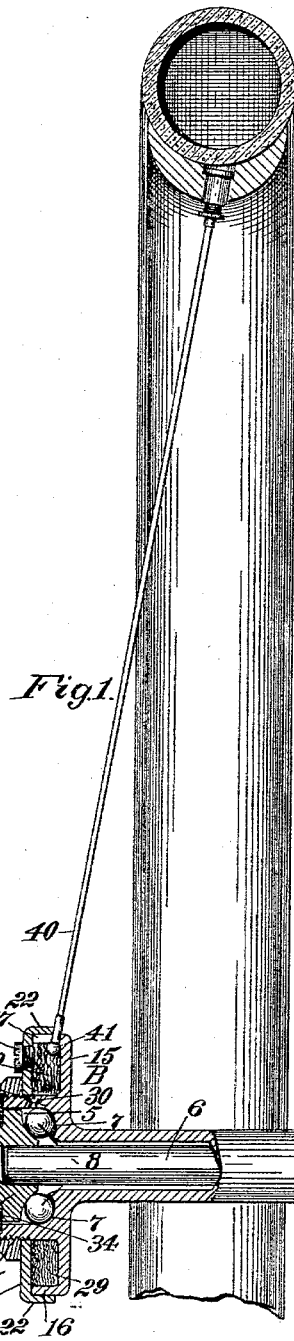
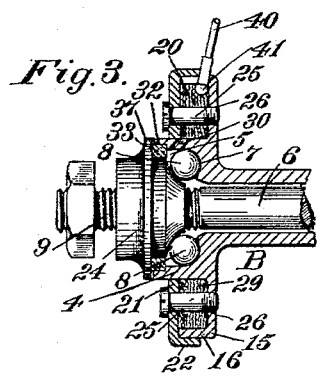
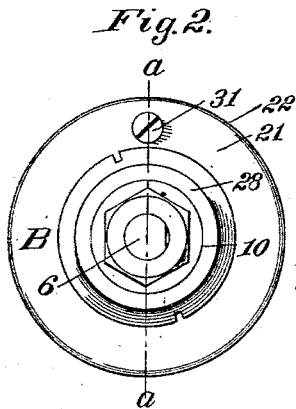
Witnesses:
R. W. Pittman.
Fred. J. Dole.
Inventor:
Arthur J Wolff.
By his Attorney
F. H. Richards.

UNITED STATES PATENT OFFICE.

ARTHUR J. WOLFF, OF HARTFORD, CONNECTICUT.

BICYCLE OR TRICYCLE WHEEL.

SPECIFICATION forming part of Letters Patent No. 559,654, dated May 5, 1896.

Application filed January 9, 1896. Serial No. 574,890. (No model.)

*To all whom it may concern:*

Be it known that I, ARTHUR J. WOLFF, a citizen of the United States, residing at Hartford, in the county of Hartford and State of Connecticut, have invented certain new and useful Improvements in Bicycle or Tricycle Wheels, of which the following is a specification.

This invention relates to wheels, but more especially, however, to that class of wheels known in the art as "bicycle" and "tricycle" wheels, and more particularly relates to the hubs and hub-bearings thereof; and the object of the invention is to provide a wheel in which the interior of the hub and its bearings will be protected from dust and dirt and in which the bearings will be regularly and constantly supplied with a suitable lubricant.

A further object of the invention is to provide means, simple in construction, which will accomplish the objects above stated and which will also constitute an additional means for securing and holding the inner ends of the spokes in position relatively to the hub.

In the drawings accompanying and forming part of this specification, Figure 1 is a diametrical partly-sectional view of a portion of a wheel, showing this improved dust and dirt protecting and lubricating means in connection therewith. Fig. 2 is an end view of the hub; and Fig. 3 is a vertical partly-sectional view of the hub, showing a somewhat different construction of means for securing the dirt-protecting means in position.

Similar characters of reference designate like parts in all the figures of the drawings.

In the preferred form thereof herein shown and described the hub (designated in a general way by B) has a suitable annular or cup-shaped flange 4 at each end thereof, opening in opposite directions to each other and surrounding the axle or shaft 6. Each of these flanges has an annular runway 7 in its inner wall for the reception of suitable bearings, such as ball-bearings 8, said wall thereby constituting one member of the bearing. Secured adjacent to each annular flange 4, and preferably forming an extension thereof, is a spoke-flange 15, and which spoke-flanges are herein shown in the nature of cup-flanges, also opening in opposite directions to each other and having the rims 16 thereof encircling the flanges 4. Each of these spoke-flanges 15 has a series of slots 17 in the rim 16 thereof, each slot preferably having differential diameters and shown herein in the nature of keyhole or buttonhole slots opening at the free edge of the rim 16. These slots are disposed in any suitable way—such, for instance, as in pairs—as shown and described in my prior patent, No. 556,123, dated March 10, 1896, as the present construction is in the nature of an improvement on the hub portion of the wheel therein shown and to which application reference is therefore made for a more explicit description of those parts not particularly embraced in this improvement.

A cap 21, having a flange or rim 22, is removably secured in position on each annular flange 4, whereby the flange or rim 22 will fit over the rim 16 of the spoke-flange 15 and close the slots 17 thereof, said cap 21 and spoke-flange 15 thus forming between them a chamber 20, surrounding the annular flange 4 and adapted to receive a suitable lubricant, and which chamber will therefore, for the purposes of this specification, be herein designated as a "lubricating-chamber." This flange or rim 22 preferably has a series of notches or recesses 23 in its free edge corresponding with the number of spokes held by the spoke-flange, whereby the rim 22 will be permitted closely to engage the spokes and not only close the slots in the rim 16, and thus prevent the dust and dirt from entering the lubricating-chamber 20, but also constitute an additional holding means for the spokes.

The other member of each bearing is preferably shown consisting of a conically-shaped nut 24, adjustably and removably secured on the shaft or axle and having its conical portion extending within the annular flange 4, and thereby holding the balls 8 in place. By this construction of flange 4 and nut 24 a chamber 5 is formed between them for the reception of the antifriction-balls 8 and the lubricant received from the lubricating-chamber 20, surrounding said chamber 5, and said chamber 5 will, for the purposes of this specification, be herein designated as a "bearing-chamber." This conically-shaped nut may be secured in place by any suitable means—such, for instance, as by having interior threads engaging with threads 9 on the shaft or axle, (see Fig. 3,) or may be secured in place by a check-nut 10, if desired, (see Fig. 1,) in which latter case the bearing member 24 can be easily removed.

Any suitable fastening means may be used for securing the caps 21 in position, and one means thereof herein shown comprises suitable fastening devices, such as screws 25, (see Fig. 3,) extending through apertures in the caps and having their threaded ends engaging threaded apertures 26 in the spoke-flanges 15.

According to another form of means for securing each cap 21 in position, each annular flange 4 of the bearing-chamber 5 has its exterior wall provided with screw-threads 27, with which a nut 28 is adapted to engage and securely hold the cap in position.

Within each lubricating-chamber 20, formed by the spoke-flange 15 and the cap 21, suitable lubricating material—such, for instance, as waste or a disk of suitable felt 29—is disposed.

Extending through each annular flange 4 of the bearing-chambers 5 and connecting each bearing-chamber and lubricating-chamber is a suitable oil duct or passage 30, preferably inclined, and by means of which the bearings will be lubricated by the lubricant fed from the lubricating-chamber. Each cap 21 is provided with a suitable oil-inlet port, (see Fig. 2,) by means of which the lubricating-chambers 20 may be supplied with oil, and which port may be closed in any suitable way—such, for instance, as by a spring-cap or by means of a headed screw 31, as herein shown.

In order to retain the lubricant within each bearing-chamber, when fed thereto, and prevent the exit thereof between the outer edge of the wall of said chamber and the conically-shaped nut, a suitable packing is disposed and held in position by any suitable means. In the construction shown in Fig. 3, however, the annular wall of each chamber 5 is provided with a suitable recess 32, fitting within which is a suitable disk of packing 33, secured therein by means of a flange 37 on the bearing member or conical nut 24.

According to another form of construction, (shown in Fig. 1,) the conically-shaped nut is cut away, as at 34, and a suitable disk of packing 35 fits around the same and is secured in position by means of an inwardly-extending circular flange 36 on the nut 28.

In assembling the parts of this improved hub the spokes 40, which may be of any suitable construction, but which are preferably provided with enlarged heads 41, are placed in position relatively to the slots 17 of the hub. The waste or disk of felt 29 is then placed in each cup-shaped flange 15 and the cap placed in position on the flanges 4, thus forming the lubricating-chambers 20, and secured thereon by the fastening devices. The lubricating-chambers are then supplied with oil, whereby the waste or disks of felt will become saturated and furnish a constant supply to the bearings by means of the oil ducts or passages 30, connecting the bearing and lubricating chambers. It will be understood, however, that any other means for supplying or conducting oil from the lubricating-chamber 20 to the bearing-chamber 5 might be used. For instance, each oil duct or passage might be provided with a wick or projection extending from the oil-holding disk for directly conveying the oil to the wearing surfaces.

In operation the interior parts of the mechanism ordinarily become heated owing to the friction of the working surfaces, while the outer parts thereof will remain cool, so that if the oil held in the disk or waste be normally of a low grade of fluidity it will naturally become heated on the inner edge of the disks or waste, and thus be made to flow more freely to the wearing surfaces, and thus cause the supply of oil to be gradually and regularly supplied to the wheel-bearings, whereby the necessity of constantly oiling the bearings by the rider is obviated.

By means of this improved construction the bearings and the interior of the hub are kept free at all times from dust and dirt, and the bearings also kept constantly supplied with a lubricant.

Having thus described my invention, I claim—

1. A bearing comprising a pair of cup-shaped flanges, one encircling the other, the inner cup-shaped flange having an oil-duct extending therethrough; closure means in position relatively to the inner flange, and forming therewith a bearing-chamber, antifriction devices in said chamber; and closure means in position relatively to the outer cup-shaped flange, and forming therewith a lubricating-chamber encircling the bearing-chamber.

2. A bearing comprising a pair of cup-shaped flanges, one encircling the other, the inner cup-shaped flange having an oil-duct extending therethrough; a conically-shaped nut in position relatively to said inner flange, and forming therewith a bearing-chamber, antifriction devices in said chamber; and a flanged cap encircling said inner cup-shaped flange, and having its flange or rim overlapping the rim or flange of said outer cup-shaped flange, and forming therewith a lubricating-chamber encircling the bearing-chamber.

3. A wheel comprising a rim and a hub; said hub having a pair of cup-shaped flanges, one encircling the other, the inner cup-shaped flange having an oil-duct extending therethrough, and the outer cup-shaped flange having its rim provided with a series of spoke-receiving openings; spokes having their outer ends connected to the wheel-rim, and their inner ends seated in said openings; and a flanged cap secured in position relatively to said outer cup-shaped flange, and forming therewith a lubricating-chamber, the flange or rim of said cap overlapping the rim of said outer cup-shaped flange, and engaging the inner ends of the spokes.

4. A wheel comprising a rim and a hub; said hub having a pair of cup-shaped flanges, one encircling the other, the inner cup-shaped flange having an oil-duct extending therethrough, and the outer cup-shaped flange having its rim provided with a series of slots; spokes having their outer ends secured to said wheel-rim, and their inner ends seated in said slots; and a flanged cap secured in position relatively to said outer cup-shaped flange, and forming therewith a lubricating-chamber, and having its flange or rim overlapping the rim of said outer flange, and provided with a series of slots also adapted to receive the inner ends of the spokes.

5. A wheel comprising a rim and a hub; said hub having a pair of cup-shaped flanges adjacent to each end thereof, one cup-shaped flange of each pair encircling the other cup-shaped flange thereof, and each pair of said flanges opening in opposite directions to each other, the inner cup-shaped flange of each pair having an oil-duct extending therethrough; and the rim of each outer cup-shaped flange having a series of slots therein; means engaging the inner cup-shaped flange, and forming therewith a chamber for the reception of antifriction-balls; spokes having their outer ends secured to said wheel-rim, and their inner ends seated in said slots; and a cap secured to each outer cup-shaped flange, and forming therewith a lubricating-chamber, and adapted to hold said spokes in position.

6. A wheel comprising a rim and a hub, said hub having a spoke-flange having an annular rim or flange with a series of elongated slots having differential diameters and opening at the free edge thereof; a series of spokes having their outer ends connected to said wheel-rim, and their inner ends seated in the slots of said annular rim; and a spoke-securing cap having an annular rim or flange overlapping the annular rim or flange of said spoke-flange and that portion of the slots having the smallest diameter and engaging the spokes, whereby dust is prevented from entering said hub.

ARTHUR J. WOLFF.

Witnesses:
FRED J. DOLE,
BENTON N. PARKER.